June 16, 1953 W. R. VOSPER 2,642,137
SELF-CENTERING CUTTER
Filed March 11, 1949 2 Sheets-Sheet 1
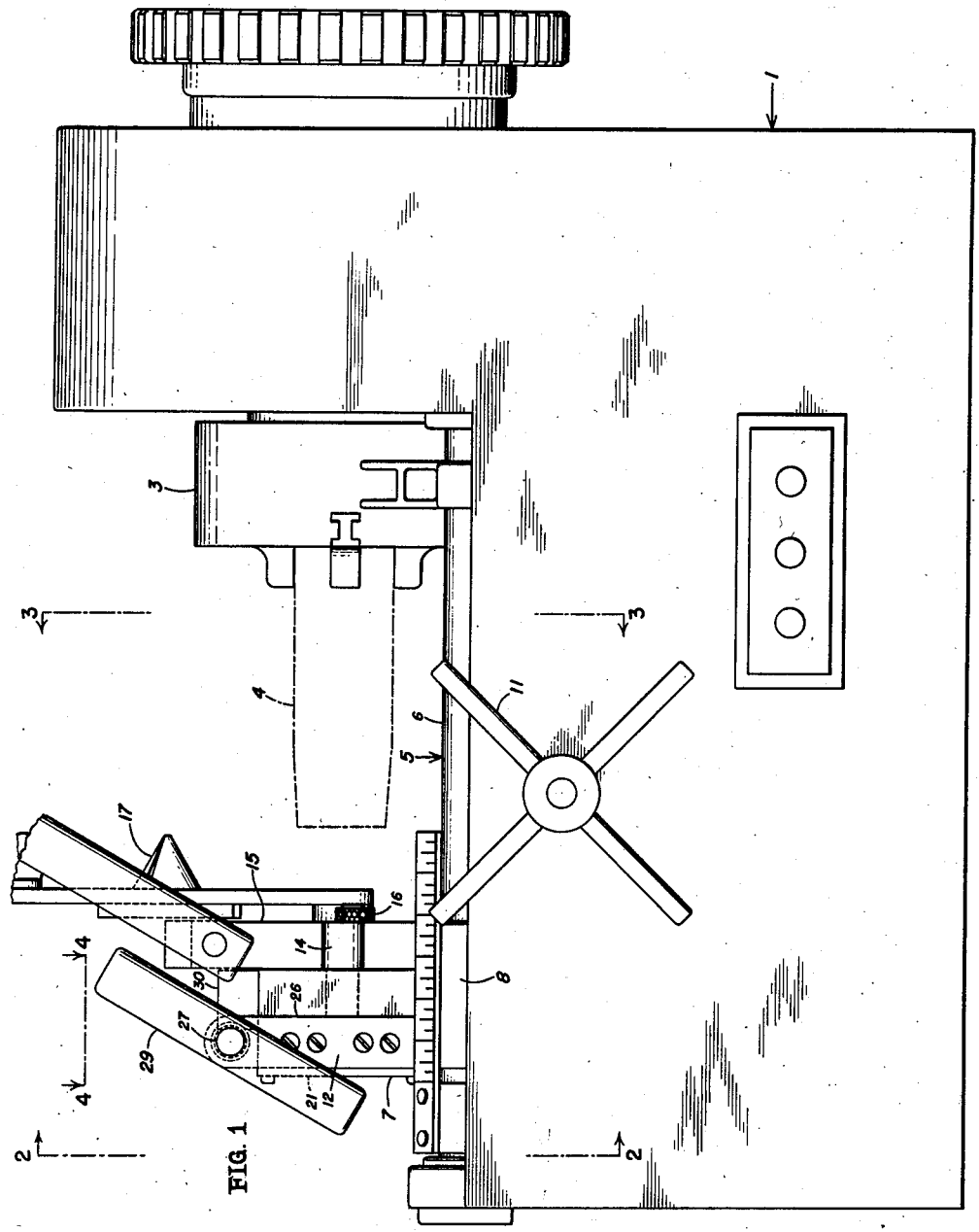
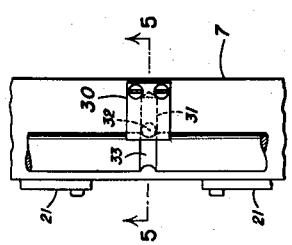
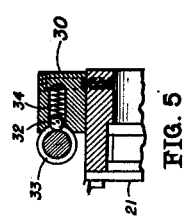
Inventor:
Waynard R. Vosper
By Wilmer Mechlin
his Attorney

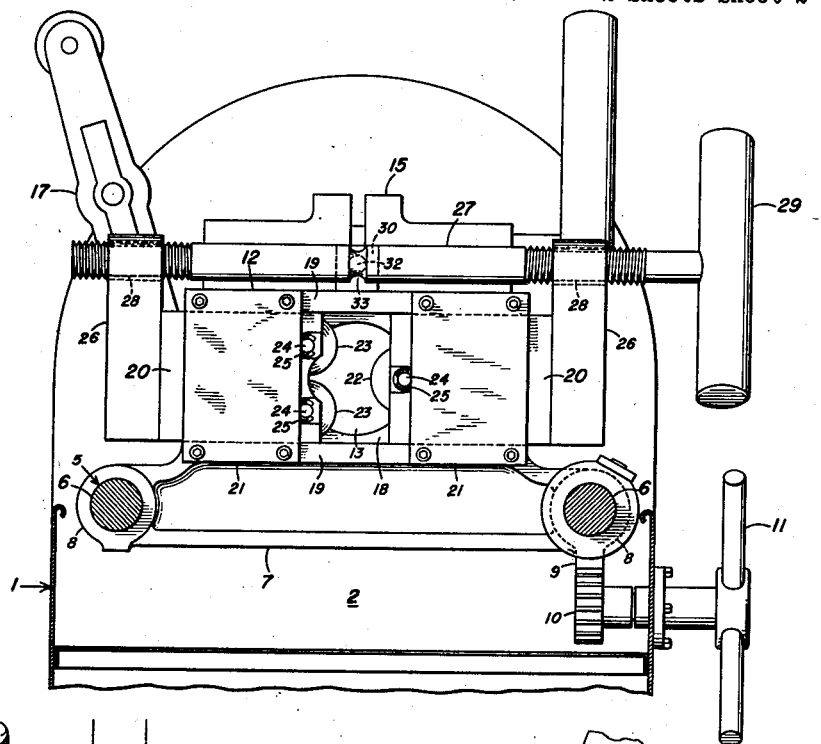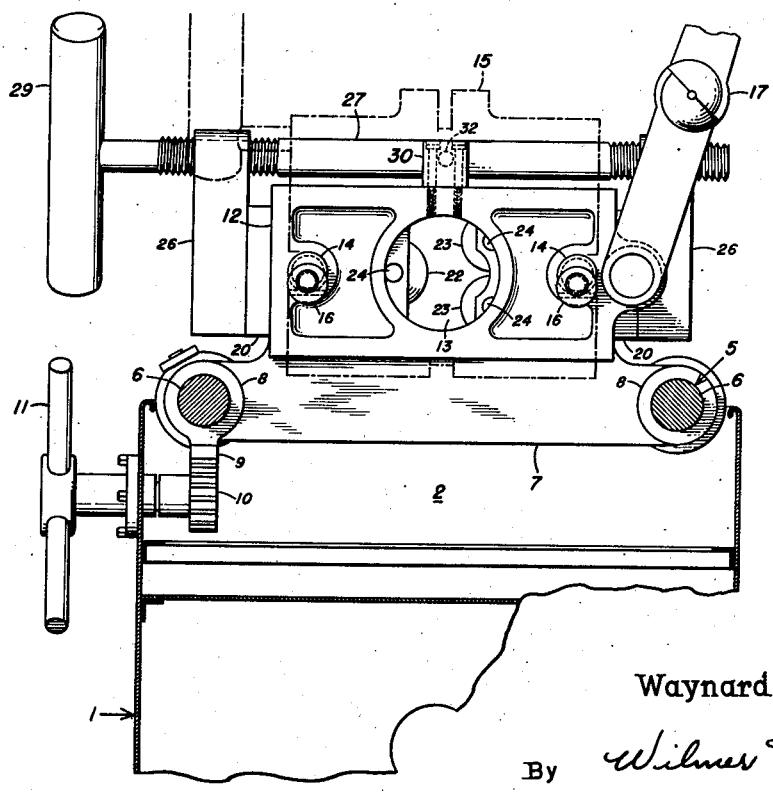

Patented June 16, 1953

2,642,137

UNITED STATES PATENT OFFICE 2,642,137

SELF-CENTERING CUTTER

Waynard R. Vosper, Guilford, Conn.

Application March 11, 1949, Serial No. 80,963

9 Claims. (Cl. 164—60)

This invention relates generally to pipe machines and more particularly to a self-centering cutter for use therewith.

The primary object of the present invention is to provide a self-centering cutter for a pipe machine in which cutter and reactance carrying blocks are shiftable both individually and in concert, enabling the cutter to center itself relative to the work, regardless of irregularities in the latter.

Another object of the invention is to provide a self-centering cutter for a pipe machine in which cutter and roller carrying blocks are connected by an adjusting screw and the latter is yieldably fixed in position relative to the supporting carriage, whereby the cutter and roller are approximately centered relative to the work and on engagement with the work, free the screw and enable the cutter and roller to shift in unison as required to center themselves upon the work.

A further object of the invention is to provide in a pipe machine a shiftable carriage having means for releasably supporting a plurality of work-treating tools.

An additional object of the invention is to provide a self-centering cutter for a pipe machine which is formed of a relatively few parts of rugged construction and is extremely efficient in operation.

Other objects and advantages of the invention will appear hereinafter in the detailed description, be particularly pointed out in the appended claims, and illustrated in the accompanying drawings in which:

Figure 1 is a side elevational view of a pipe machine incorporating a preferred embodiment of the invention;

Figure 2 is a vertical sectional view, taken along the line 2—2 of Figure 1;

Figure 3 is a vertical sectional view, taken along the line 3—3 of Figure 1;

Figure 4 is a fragmentary plan of the machine of Figure 1, viewed from the line 4—4 of Figure 1; and Figure 5 is a vertical sectional view, taken along the line 5—5 of Figure 4.

Referring now in detail to the drawings in which like reference characters designate like parts, the device of the present invention is particularly adapted for use with pipe machines, of which the machine shown is illustrative. As there shown, the machine includes a suitable frame, support or base 1, having a longitudinally extending trough or work-bed 2. Adjacent one end of the trough is mounted a rotary chuck 3 driven through suitable gearing and a motor (not shown) and adapted to rotate pipe, bar stock or like cylindrical work, indicated diagrammatically at 4. Extending longitudinally of the trough 2 parallel to the axis of the chuck is a guideway 5, which may be in the form of the illustrated spaced parallel guide rails or rods 6, one disposed adjacent each side of the trough.

Using the illustrated guide rods 6 as the guideway, the device of the present invention is comprised of a carriage 7, disposed transversely or crosswise of, or normal to the guideway and slidably mounted thereon through preferably integral cylindrical bosses 8. For sliding or shifting the carriage longitudinally along the guide rods, there is provided a rack 9, formed as part of the carriage and adapted to engage a pinion 10 mounted on the base and rotatable through a hand wheel 11.

The main portion of the carriage 7 is comprised of a head or plate member 12, disposed normal to and intercepting the axis of the chuck 3 and having a work-receiving, substantially annular aperture, opening or collar 13, axially aligned therewith. Projecting perpendicularly of the inner or chuck confronting vertical face of the carriage on opposite sides of the aperture are a pair of studs or pins 14 for supporting a die head 15, particularly of the self-feeding collapsible type covered by my copending application Ser. No. 47,979, filed September 7, 1948. For releasably locking the die head to the carriage, a rotary disc 16 is eccentrically mounted on the outer end of each stud, below its axis. These discs are of the same cross-section as the studs and thus, while normally projecting below the studs and enabled to lock the die head in place, can be turned in line with the studs when application or removal of the die head is desired. As shown, a reamer 17 may also be mounted on the inner face of the carriage.

In the carriage rearwardly or outwardly of its chuck confronting face, is a slot, channel or groove 18, the latter extending longitudinally across the head, transversely of the guideway 5, and overlying or being interrupted by the work-receiving aperture 13. As shown, the slot is preferably formed in the outer or end vertical face of the head and is open at both ends, its sides intermediate the ends being defined by spaced parallel ribs 19.

In the slot 18 are slidably received, mounted or carried a pair of blocks or slide members 20. Although the blocks may be retained or held in the slots by flanging of the ribs 19, this is accomplished in the illustrated embodiment by the providing of a pair of spaced cover plates 21, covering or enclosing the outer or open face of the slot outwardly of the aperture 13, and preferably removably attached to the head.

The confronting faces of the blocks 20 are recessed to receive, respectively, a cutting member 22, preferably in the form of a rotary cutting disc or wheel, and one or more reactance members 23 opposing the cutting member. While the reactance members may also be cutting wheels, it has been found adequate to employ but a single cutter and use rollers as the reactance members. The illustrated cutter and rollers are rotatably mounted in the recesses in their respective blocks by pins or shafts 24. To enable ready replacement of the several members, the shafts 24 are removably connected to the blocks, as by the illustrated split spring rings 25, these rings as well as the remainder of the shafts being contained wholly within the confines of the blocks to prevent interference with movement of the latter.

The blocks 20 extend beyond the ends of the slot 18 and outwardly thereof are provided with either detachable or integral ears, jaws or posts 26, end portions of which project clear of or above the corresponding or upper edge of the carriage 7. Connecting the ears 26 and thus the blocks, is a right- and left-hand threaded screw or actuating member 27, disposed clear of the carriage and parallel to the longitudinal axis of the slot 18 and having each of its oppositely threaded portions received in and threadedly engaging internally threaded bores 28, formed in the end portions of the ears. For operating or turning the screw, there may be attached to one of its ends outwardly of the adjacent of the ears 26, an operating handle 29.

With the blocks connected solely by the screw 27 and the latter in turn supported only by the ears 26, the blocks are enabled to be moved or slid relative to each other in the slot 18 by rotation of the screw to vary the gap or spacing between the cutter 22 and rollers 23. Thus, floating or slidably engaging the carriage through the blocks 20, the cutter assembly of blocks and screw is shiftable as a unit, in unison or in concert relative to the carriage.

With the above construction, the rollers 23 and cutter 22, once one or the other has engaged the pipe or other work 4 intended to be cut, will cause the cutter assembly to shift until the opposing member engages the pipe and thereafter shift as a unit as the screw 27 is progressively turned or tightened to accommodate any irregularities in configuration or axial disposition of the pipe. However, such a free floating cutter assembly has the disadvantage of requiring both proper spacing of the cutter members and shifting of the entire unit each time pipe is to be cut. Accordingly, an important feature of the present invention is the provision of means for approximately centering the cutter blocks relative to the work-receiving aperture 13 without interference with shifting of the assembly as a unit when necessary to render it self-centering. For this purpose there is mounted on or connected to the carriage 7, and preferably centrally thereof, yieldable means having a housing 30, positioned adjacent and intermediate the oppositely threaded ends of this screw. This housing is provided with a cylindrical bore 31, disposed substantially radially of the screw, in which is housed or seated a springpressed or urged ball or latch member 32 which is adapted to ride in an annular or peripheral groove 33 formed in the shank of the screw.

Designed approximately to center the blocks 20, the annular groove 33 is so positioned relative to both the ball 32 and the shank of the screw that, when it is engaged by the ball, the cutter wheel and rollers will be approximately equi-distant from the axis of the aperture 13. While ball and groove are so engaged, axial movement of the screw is prevented and the latter is limited in its function to adjusting relatively the positions of the blocks 20. However, once the cutter or the reactance members has engaged the pipe to be cut, the axial force transmitted to the screw on further turning, will displace or disengage the ball from the groove, enabling the cutter assembly thereafter to shift as a unit. On completion of a cutting operation, it is only necessary to shift the screw axially until the ball again engages the groove, to recenter the cutter assembly.

During this shifting phase of operation of the cutter assembly, the ball 32 under impetus of its coil spring or like resilient means 34 will bear against the shank of the screw 27 beyond the groove 33 and frictionally resist shifting. To minimize the resultant axial component of this resistance, the shank of the screw is made smooth or unthreaded for a considerable distance on either side of the groove, such that its engagement with the displaced ball is limited to point contact. The radial component of resistance can also be minimized by use of a relatively weak spring having merely sufficient force to inhibit undesired dislodgement of the ball from the groove. This minimization of force is also applied to the relation of the screw to the blocks 20. Disposed outwardly of the line of stress of the cutter and reactance members, the screw would normally be subjected to large bending stresses adjacent either end. However, due to the ruggedness of construction of the unit and the sliding fit of the blocks within the slot, the forces capable of transmitting such stresses are, for the most part, absorbed by the carriage.

The construction of the device of the present invention is designed not only to permit its ready assembly and disassembly, but to facilitate initial manufacture. Thus, the carriage 7 itself may be formed as an integral casting. Additionally, the cover plates 21 and ears 26, as previously mentioned, as well as the housing 30 of the yieldable latch are adapted to be made separately and detachably connected to the parts on which they are mounted. Further, as shown, the end of the screw 27, to which its handle is attached, is of reduced section such that it can pass freely through the bore 31 in the adjacent ear 26.

From the above detailed description it will be apparent that there has been provided an improved self-centering cutter particularly adapted for use in a pipe machine, in which a pair of opposed blocks carrying cutter and reactance members may be moved either relatively or in unison along a slideway and movement in unison is normally prevented, enabling the members approximately to center themselves relative to the work to be treated. It should be understood that the described and disclosed embodiment is merely exemplary of the invention and that all modifications are intended to be included which do not depart either from the spirit of the invention or the scope of the appended claims.

Having described my invention, I claim:

1. In a pipe machine, a supporting member having a slideway, a pair of blocks carried by and slidably engaging said slideway, a cutter carried by one of said blocks and a reactance carried by said other block, means consisting of an actuating member connecting said blocks and adapted to move said blocks both relatively and shift said blocks as a unit along said slideway, and yieldable means normally locking said blocks against said shifting.

2. In a pipe machine, a supporting member having a slot, a pair of blocks slidably mounted in said slot, a cutter carried by one of said blocks and a reactance carried by said other block, means consisting of a right- and left-hand threaded screw connecting said blocks and adapted to move said blocks both relatively and shift said blocks as a unit along said slot, and yieldable means normally locking said blocks against said shifting.

3. In a pipe machine having a base supporting a rotary chuck and a guideway extending longitudinally of said base, a self-centering cutter comprising a carriage slidably mounted on and having a slot positioned normal to said guideway, a pair of blocks slidably mounted in said slot, a cutting member carried by one of said blocks and a reactance carried by said other block, means for relatively adjusting the positions of said blocks, and releasably means normally centering said blocks relative to said chuck, said blocks on release of said releasable means being shiftable as a unit in said slot.

4. In a pipe machine having a base supporting a rotary chuck and a guideway extending longitudinally of said base, a self-centering cutter comprising a carriage slidably mounted on said guideway and having a slot disposed transversely thereof, a pair of blocks slidably mounted in said slot, a cutter carried by one of said blocks and a reactance carried by said other block, means for relatively adjusting the positions of said blocks, and means associated with said adjusting means for releasably centering said blocks relative to said chuck, said blocks on release of said centering means being shiftable as a unit in said slot.

5. In a pipe machine having a base supporting a rotary chuck and a guideway extending longitudinally of the base, a self-centering cutter comprising a carriage slidably mounted on said guideway and having a slot disposed transversely thereof, a pair of blocks slidably mounted in said slot, said blocks carrying, respectively, a cutter wheel and an opposed roller, a right- and left-hand threaded screw connecting said blocks for relatively adjusting the spacing therebetween, and means yieldably engaging a groove in said screw for normally centering said blocks relative to said chuck, said blocks and screw on disengagement of said yieldable means from said groove being shiftable in concert relative to said slot.

6. In a pipe machine having a base supporting a rotary chuck and a guideway extending longitudinally of the base, a self-centering cutter comprising a carriage slidably mounted on said guideway, a slot interrupting a side of said carriage and disposed transversely of said guideway, a pair of blocks slidably mounted in said slot, said blocks carrying, respectively, a cutter wheel and an opposed roller, detachable means for partially enclosing a side of said slot, a right- and left-hand threaded screw connecting said blocks for relatively adjusting the positions thereof, an annular groove formed in said screw intermediate the ends thereof, and a yieldable latch mounted on said carriage and normally engaging said groove, said screw and blocks on disengagement of said latch from said groove being shiftable in concert relative to said carriage.

7. In a pipe machine having a base supporting a rotary chuck and a guideway extending longitudinally of the base, a self-centering cutter comprising a carriage slidably mounted on said guideway and having a slot disposed transversely thereof, a pair of blocks slidably mounted in said slot, said blocks carrying, respectively, a cutter wheel and an opposed roller, means for partially enclosing said slot and maintaining said blocks therein, a right- and left-hand threaded screw connecting said blocks for relatively adjusting the positions thereof, an annular groove formed in said screw intermediate the ends thereof, and a spring-urged ball mounted on said carriage and yieldably engaging said groove for normally fixing the axial position of said screw relative to said carriage, said screw and blocks on disengagement of said ball from said groove being shiftable as a unit relative to said carriage.

8. In a pipe machine having a base supporting a rotary chuck and a guideway extending longitudinally of the base, the combination of a carriage slidably mounted on and disposed transversely of said guideway, said carriage having a work-receiving opening in axial alignment with said chuck, spaced studs projecting from a vertical face of said carriage on opposite sides of said aperture and disposed parallel to the axis thereof for mounting a die head on said carriage, a disc eccentrically mounted on each of said studs for releasably locking said die head to said carriage, a slot formed in an opposite vertical face of said carriage and extending transversely of said guideway across said aperture, a pair of blocks slidably mounted in said slot, said blocks carrying, respectively, a cutter wheel and an opposed roller, a right- and left-hand threaded screw connecting said blocks for adjusting the positions of said blocks relative to each other and to said aperture, a peripheral groove formed in said screw intermediate the ends thereof, and a spring-urged ball mounted on said carriage and yieldably engaging said groove for normally fixing the axial position of said screw relative to said carriage, said screw and blocks on disengagement of said ball from said groove being shiftable as a unit relative to said carriage.

9. In a pipe machine having a base supporting a rotary chuck and a guideway extending longitudinally of the base, a self-centering cutter comprising a carriage slidably mounted on said guideway and having a slot disposed transversely thereof, said carriage having a work-receiving aperture interrupting said slot and axially aligned with said chuck, a pair of blocks slidably mounted in said slot, said blocks carrying, respectively, a cutter wheel and an opposed roller, a right- and left-hand threaded screw connecting said blocks for adjusting the relative positions thereof, and yieldable means mounted on said carriage and normally engaging an annular groove in said screw for centering said blocks relative to said aperture, said screw and blocks on disengagement of said yieldable means from said groove being shiftable as a unit relative to said carriage.

WAYNARD R. VOSPER.

References Cited in the file of this patent

UNITED STATES PATENTS

| Number | Name | Date |
|---|---|---|
| 430,825 | Bretland | June 24, 1890 |
| 460,774 | Gibbs | Oct. 6, 1891 |
| 957,721 | Troup | May 10, 1910 |
| 1,302,532 | Donaldson | May 6, 1919 |
| 2,079,180 | Pealer | May 4, 1937 |
| 2,552,094 | Hamon et al. | May 8, 1951 |

FOREIGN PATENTS

| Number | Country | Date |
|---|---|---|
| 538,445 | Great Britain | Aug. 5, 1941 |